(12) United States Patent
Fadida et al.

(10) Patent No.: US 12,720,233 B2
(45) Date of Patent: Aug. 25, 2026

(54) PHOTON COUNTING IMAGE SENSOR

(71) Applicant: SEMICONDUCTOR COMPONENTS INDUSTRIES, LLC, Scottsdale, AZ (US)

(72) Inventors: Gal Fadida, Odem (IL); Ben Dror, Maale Gamla (IL); Erez Tadmor, Atlit (IL)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 188 days.

(21) Appl. No.: 18/748,818

(22) Filed: Jun. 20, 2024

(65) Prior Publication Data

US 2025/0133307 A1 Apr. 24, 2025

Related U.S. Application Data

(60) Provisional application No. 63/591,389, filed on Oct. 18, 2023.

(51) Int. Cl.
*H04N 25/771* (2023.01)
*H04N 25/76* (2023.01)

(52) U.S. Cl.
CPC ....... *H04N 25/771* (2023.01); *H04N 25/7795* (2023.01)

(58) Field of Classification Search
CPC ............. H04N 25/771; H04N 25/7795; H04N 25/773; H04N 25/70
See application file for complete search history.

(56) References Cited

U.S. PATENT DOCUMENTS 8,089,544 B2 * 1/2012 Funaki .................. H04N 25/57 348/308
9,380,245 B1 6/2016 Guidash et al.
(Continued)

FOREIGN PATENT DOCUMENTS

DE 112018002674 T5 3/2020
DE 102021114313 A1 12/2022
(Continued)

OTHER PUBLICATIONS

Ota, et al. "A 0.37W 143dB-Dynamic-Range 1Mpixel Backside-Illuminated Charge-Focusing SPAD Image Sensor with Pixel-Wise Exposure Control and Adaptive Clocked Recharging", ISSCC 2022 / SESSION 5 / Imagers, Range Sensors and Dispays / 5.1; 2022, 3 pgs.

(Continued)

*Primary Examiner* — Nhan T Tran
(74) *Attorney, Agent, or Firm* — Slayden Grubert Beard PLLC

(57) ABSTRACT

An image sensor pixel is provided that includes a single-photon avalanche diode (SPAD), an analog counter coupled to a cathode terminal of the SPAD, and a comparator having a first input coupled to a floating diffusion node in the analog counter, a second input configured to receive a reference voltage, and a clock input configured to receive a comparator clock signal from the analog counter. The image sensor pixel can further include an analog memory circuit selectively coupled to an output of the comparator. The analog memory circuit can include a read enable switch coupled between the output of the comparator and a storage node and a plurality of capacitors coupled to the storage node via respective switches.

19 Claims, 7 Drawing Sheets

(56) References Cited

U.S. PATENT DOCUMENTS

| | | | | |
|---|---|---|---|---|
| 10,419,701 | B2 * | 9/2019 | Liu | G01J 1/44 |
| 11,005,495 | B1 | 5/2021 | Veeder et al. | |
| 11,812,178 | B2 * | 11/2023 | Fukuhara | H04N 25/778 |
| 2004/0017224 | A1 | 1/2004 | Tumer et al. | |
| 2010/0213353 | A1 * | 8/2010 | Dierickx | G01T 1/17<br>250/214 R |
| 2018/0176490 | A1 * | 6/2018 | Nakamizo | H10F 39/809 |
| 2018/0372873 | A1 * | 12/2018 | Koifman | G01S 7/484 |
| 2019/0191118 | A1 * | 6/2019 | Aoki | H04N 25/76 |
| 2020/0158836 | A1 * | 5/2020 | Henderson | G01S 17/894 |
| 2020/0182983 | A1 * | 6/2020 | Calder | G01S 7/4861 |

FOREIGN PATENT DOCUMENTS

| | | | |
|---|---|---|---|
| EP | 1614159 | B1 | 2/2014 |
| EP | 2770730 | A1 | 8/2014 |
| EP | 3861716 | B1 | 10/2023 |
| WO | 2019194891 | A1 | 10/2019 |
| WO | 2020033001 | A2 | 2/2020 |
| WO | 2020118017 | A1 | 6/2020 |

OTHER PUBLICATIONS

Dutton et al., “A SPAD-Based QVGA Image Sensor for Single-Photon Counting and Quanta Imaging”, IEEE Transactions on Electron Devices, vol. 63, No. 1, Jan. 2016, 8 pgs.

* cited by examiner

PHOTON COUNTING IMAGE SENSOR

This application claims the benefit of U.S. Provisional Patent Application No. 63/591,389, filed Oct. 18, 2023, which is hereby incorporated by reference herein in its entirety.

BACKGROUND

Image sensors are commonly used in electronic devices such as cellular telephones, cameras, computers, automobiles, and other systems to capture images. In a typical arrangement, an image sensor includes an array of image pixels arranged in pixel rows and pixel columns. Each image pixel can include a photosensitive element coupled to associated transistors.

It is within this context that the embodiments described herein arise.

DETAILED DESCRIPTION

Embodiments of the present technology relate to image sensors. It will be recognized by one skilled in the art that the present exemplary embodiments may be practiced without some or all of these specific details. In other instances, well-known operations have not been described in detail in order not to unnecessarily obscure the present embodiments.

Electronic devices such as digital cameras, computers, cellular telephones, and other electronic devices may include image sensors that gather incoming light to capture an image. The image sensors may include arrays of pixels. The pixels in the image sensors may include photosensitive elements such as single-photon avalanche diodes (SPADs) that convert impinging photons into electrons or holes. Image sensor pixels that include SPADs may be referred to herein as SPAD based imaging pixels. Image sensors that includes SPAD based imaging pixels may be referred to as SPAD based image sensors. SPAD based image sensors may have any number of pixels (e.g., hundreds, thousands, or millions of pixels. Image sensors may include control circuitry such as circuitry for operating the pixels and readout circuitry for reading out image signals corresponding to the electric charge generated by the photosensitive elements.

Figure 1:
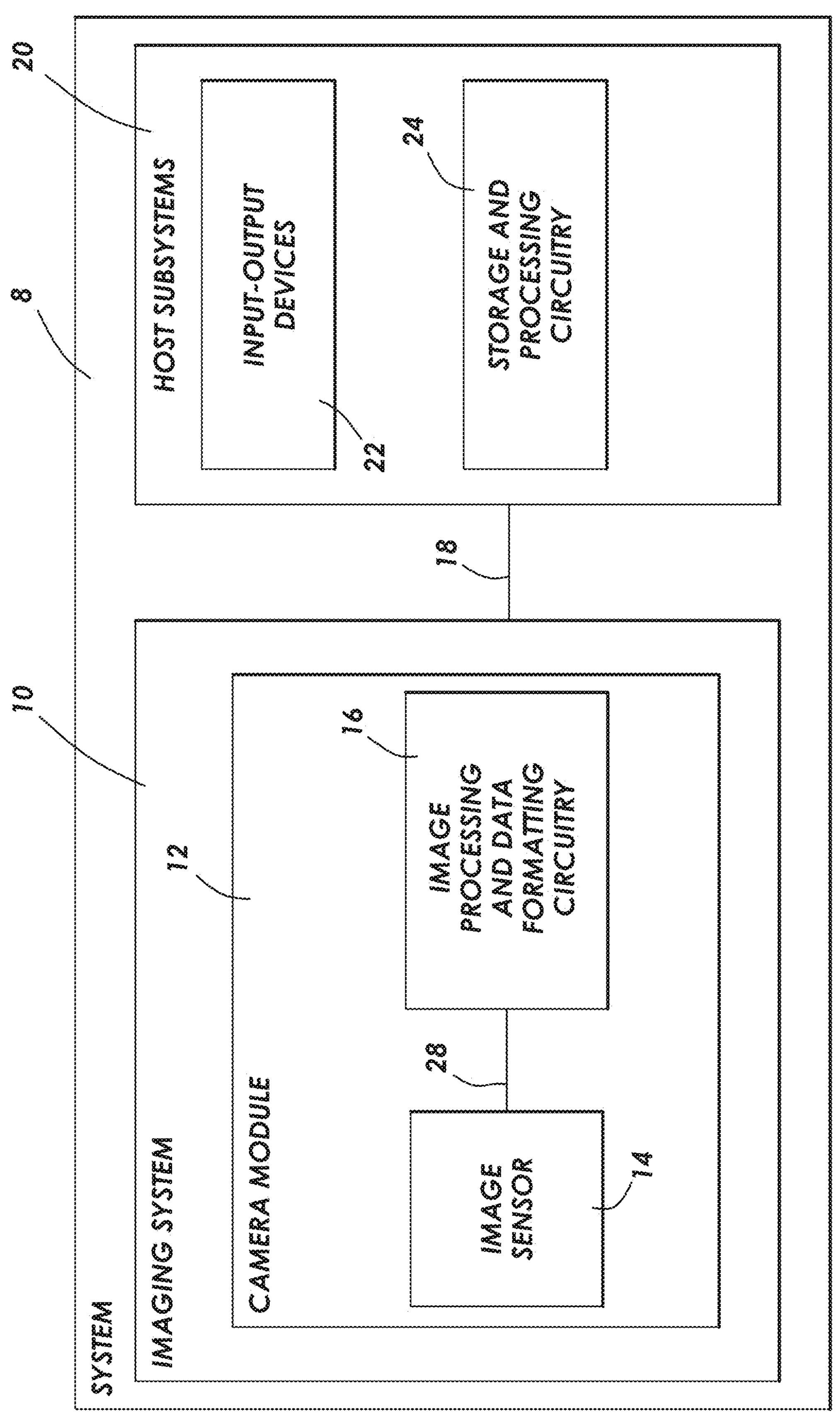
FIG. 1 is a diagram of an illustrative electronic device having an image sensor in accordance with some embodiments.

FIG. 1 is a diagram of an illustrative imaging and response system including an imaging system that uses an image sensor to capture images. System 8 of FIG. 1 may be an electronic device such as a camera, a cellular telephone, a video camera, or other electronic device that captures digital image data, may be a vehicle safety system (e.g., an active braking system or other vehicle safety system), or may be a surveillance system. As shown in FIG. 1, system 8 may include an imaging system such as imaging system 10 and host subsystems such as host subsystem 20. Imaging system 10 may include camera module 12. Camera module 12 may include one or more image sensors 14, such as in an image sensor array integrated circuit, and one or more lenses. Image sensor 14 may be a SPAD based image sensor. During image capture operations, each lens may focus light onto an associated SPAD based image sensor 14. Image sensor 14 may include photosensitive elements (i.e., SPAD based image sensor pixels) that convert the light into corresponding data. Image sensors may have any number of pixels (e.g., hundreds, thousands, millions, or more). A typical image sensor may, for example, have millions of pixels (e.g., megapixels).

Each image sensor in camera module 12 may be identical or there may be different types of image sensors in a given image sensor array integrated circuit. In some examples, image sensor 14 may further include bias circuitry (e.g., source follower load circuits), sample and hold circuitry, correlated double sampling (CDS) circuitry, amplifier circuitry, analog-to-digital converter circuitry, data output circuitry, memory (e.g., buffer circuitry), and/or address circuitry.

Still and video image data from image sensor 14 may be provided to image processing and data formatting circuitry 16 via path 28. Image processing and data formatting circuitry 16 may be used to perform image processing functions such as data formatting, adjusting white balance and exposure, implementing video image stabilization, or face detection. Image processing and data formatting circuitry 16 may additionally or alternatively be used to compress raw camera image files if desired (e.g., to Joint Photographic Experts Group or JPEG format).

In one example arrangement, such as a system on chip (SoC) arrangement, sensor 14 and image processing and data formatting circuitry 16 are implemented on a common semiconductor substrate (e.g., a common silicon image sensor integrated circuit die). If desired, sensor 14 and image processing circuitry 16 may be formed on separate semiconductor substrates. For example, sensor 14 and image processing circuitry 16 may be formed on separate substrates that have been stacked.

Imaging system 10 may convey acquired image data to host subsystem 20 over path 18. Host subsystem 20 may include input-output devices 22 and storage processing circuitry 24. Host subsystem 20 may include processing software for detecting objects in images, detecting motion of objects between image frames, determining distances to objects in images, or filtering or otherwise processing images provided by imaging system 10. For example, image processing and data formatting circuitry 16 of the imaging system 10 may communicate the acquired image data to storage and processing circuitry 24 of the host subsystems 20.

If desired, system 8 may provide a user with numerous high-level functions. In a computer or cellular telephone, for example, a user may be provided with the ability to run user applications. For these functions, input-output devices 22 of host subsystem 20 may include keypads, input-output ports, buttons, and displays and storage and processing circuitry 24. Storage and processing circuitry 24 of host subsystem 20 may include volatile and/or nonvolatile memory (e.g., random-access memory, flash memory, hard drives, solid-state drives, etc.). Storage and processing circuitry 24 may additionally or alternatively include microprocessors, microcontrollers, digital signal processors, and/or application specific integrated circuits.

Figure 2:
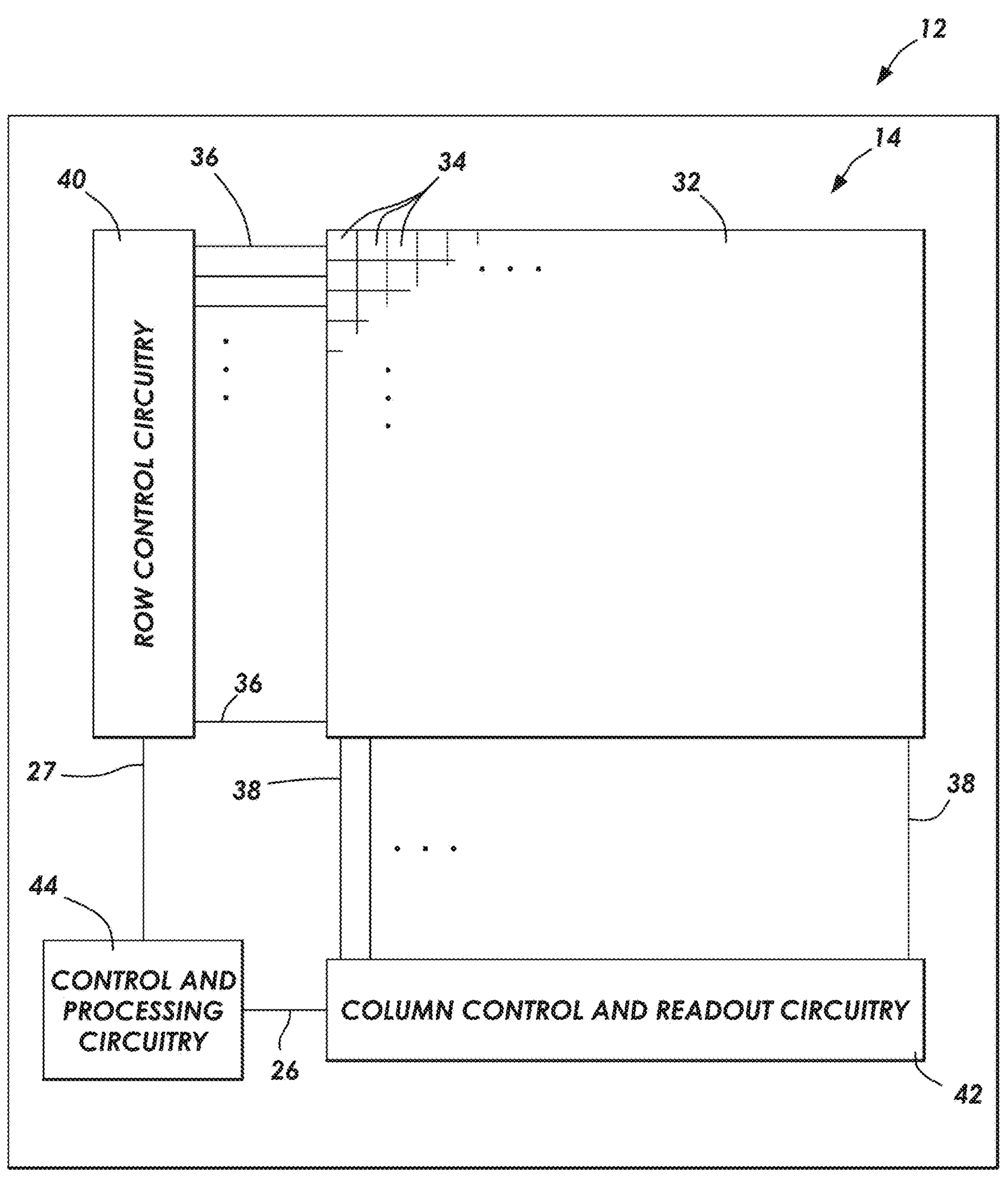
FIG. 2 is a diagram of an illustrative pixel array and associated row and column control circuitry for reading out image signals from an image sensor in accordance with some embodiments.

An example of an arrangement of SPAD based image sensor 14 of FIG. 1 is shown in FIG. 2. As shown in FIG. 2, image sensor 14 may include control and processing circuitry 44. Control and processing circuitry 44 (sometimes referred to as control and processing logic) may be part of image processing and data formatting circuitry 16 in FIG. 1 or may be separate from circuitry 16. Image sensor 14 may include a pixel array such as array 32 of SPAD based pixels 34 (sometimes referred to herein as image sensor pixels, imaging pixels, or image pixels). Control and processing circuitry 44 may be coupled to row control circuitry 40 via control path 27 and may be coupled to column control and readout circuits 42 via data path 26.

Row control circuitry 40 may receive row addresses from control and processing circuitry 44 and may supply corresponding row control signals to image pixels 34 over one or more control paths 36. The row control signals may include pixel reset control signals, charge transfer control signals, blooming control signals, row select control signals, dual conversion gain control signals, or any other desired pixel control signals.

Column control and readout circuitry 42 may be coupled to one or more of the columns of pixel array 32 via one or more conductive lines such as column lines 38. A given column line 38 may be coupled to a column of image pixels 34 in image pixel array 32 and may be used for reading out image signals from image pixels 34 and for supplying bias signals (e.g., bias currents or bias voltages) to image pixels 34. In some examples, each column of pixels may be coupled to a corresponding column line 38. For image pixel readout operations, a pixel row in image pixel array 32 may be selected using row driver circuitry 40 and image data associated with image pixels 34 of that pixel row may be read out by column readout circuitry 42 on column lines 38. Column readout circuitry 42 may include column circuitry such as column amplifiers for amplifying signals read out from array 32, sample and hold circuitry for sampling and storing signals read out from array 32, analog-to-digital converter circuits for converting read out analog signals to corresponding digital signals, or column memory for storing the readout signals and any other desired data. Column control and readout circuitry 42 may output digital pixel readout values to control and processing logic 44 over line 26.

Array 32 may have any number of rows and columns. In general, the size of array 32 and the number of rows and columns in array 32 will depend on the particular implementation of image sensor 14. While rows and columns are generally described herein as being horizontal and vertical, respectively, rows and columns may refer to any grid-like structure. Features described herein as rows may be arranged vertically and features described herein as columns may be arranged horizontally.

Pixel array 32 may optionally be provided with a color filter array having multiple color filter elements which allows a single image sensor to sample light of different colors. As an example, image sensor pixels such as the image pixels in array 32 may be provided with a color filter array which allows a single image sensor to sample red, green, and blue (RGB) light using corresponding red, green, and blue image sensor pixels. The red, green, and blue image sensor pixels may be arranged in a Bayer mosaic pattern. The Bayer mosaic pattern consists of a repeating unit cell of two-by-two image pixels, with two green image pixels diagonally opposite one another and adjacent to a red image pixel diagonally opposite to a blue image pixel. In another example, broadband image pixels having broadband color filter elements (e.g., clear color filter elements) may be used instead of green pixels in a Bayer pattern. These examples are merely illustrative and, in general, color filter elements of any desired color (e.g., cyan, yellow, red, green, blue, etc.) and in any desired pattern may be formed over any desired number of image pixels 34.

Figure 3:
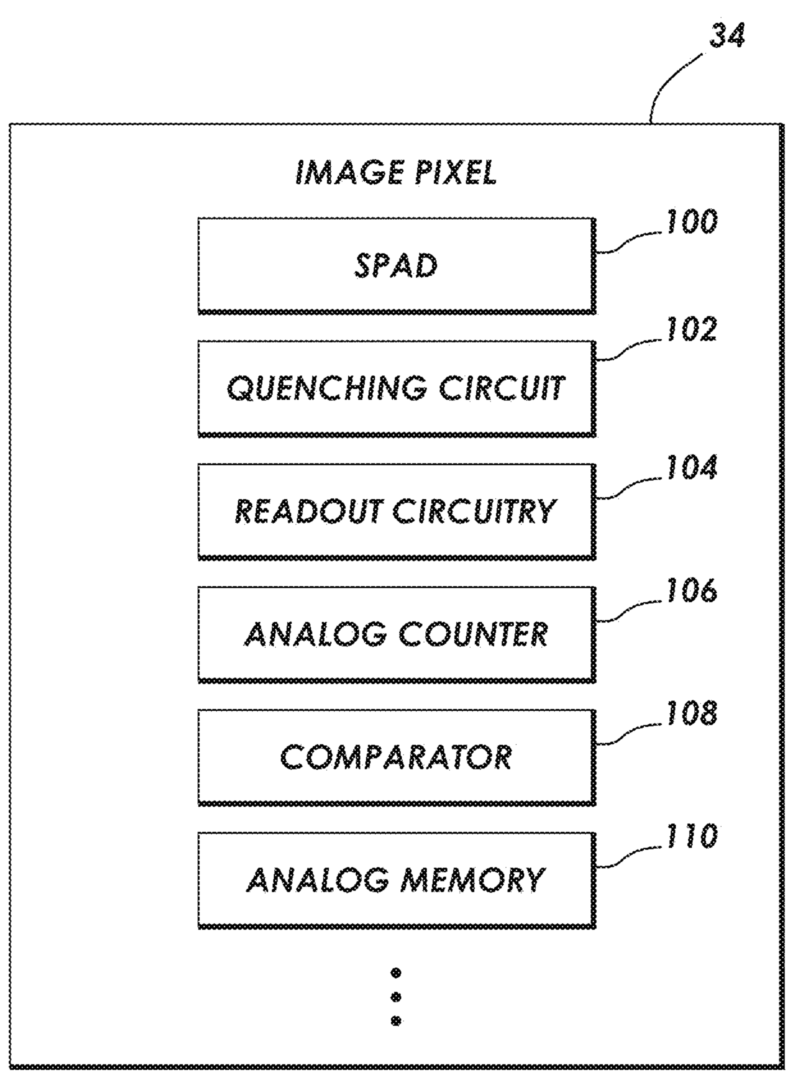
FIG. 3 is a block diagram of an illustrative single-photon avalanche diode (SPAD) based image pixel in accordance with some embodiments.

FIG. 3 is a block diagram of a SPAD based image pixel such as image pixel 34. SPAD based image sensors can be configured to count the number of impinging photons. Such type of photon-counting image sensor can provide improved low light signal-to-noise ratio (SNR) while maintaining high dynamic range. In accordance with an embodiment, an image sensor is provided that includes an array of SPAD based image pixels having a design that is technically advantageous due to its minimal area overhead and reduced power consumption compared to other state-of-the-art SPAD based image sensors. As shown in FIG. 3, image pixel 34 can include a single-photon avalanche diode such as SPAD 100, an associated quenching circuit such as quenching circuit 102, readout circuitry such as readout circuitry 104, an analog counting circuit such as analog counter 106, a comparison circuit such as comparator 108, an analog storage circuit such as analog memory 110, and optionally other circuit components. In contrast, conventional SPAD based image pixels can include digital counters, which take up substantially more circuit area and thus increase cost.

SPAD 100, sometimes referred to as a light-sensing diode, may be biased above its breakdown point and when an incident photon from a light source generates an electron or hole, this carrier initiates an avalanche breakdown with additional carriers being generated. The avalanche multiplication may produce a current signal that can be easily detected by readout circuitry 104 associated with the SPAD 100. The avalanche process needs to be stopped (quenched) by lowering the diode bias below its breakdown point. For example, the control circuitry such as circuitry 40 and/or 44 in FIG. 2 may operate quenching circuit 102 or other adjustable (transistor) circuitry within each SPAD pixel to control one or more bias voltages provided to each SPAD pixel.

Figure 4:
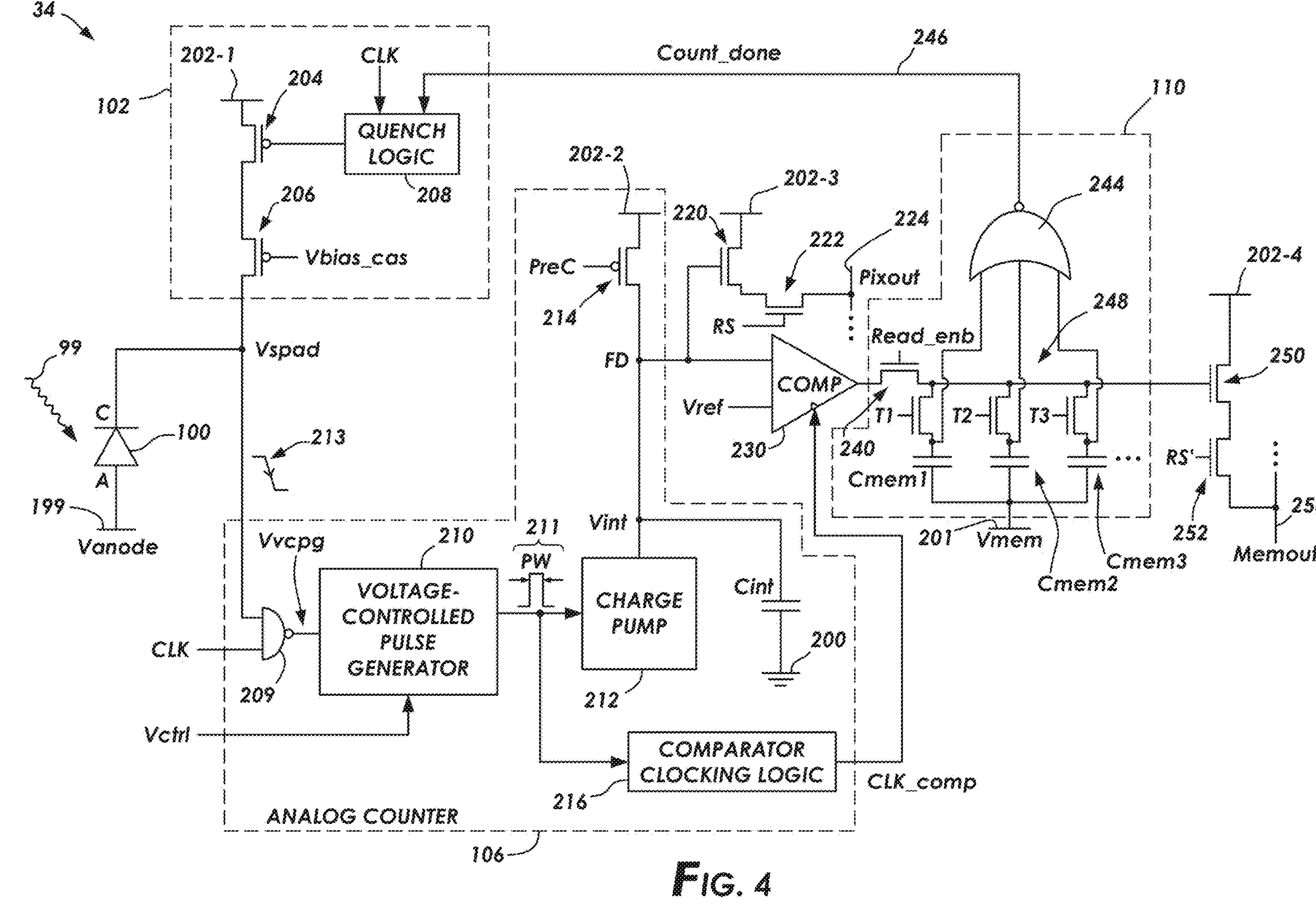
FIG. 4 is a circuit diagram showing one illustrative implementation of the SPAD based image pixel of the type shown in FIG. 3 in accordance with some embodiments.

FIG. 4 is a circuit diagram showing one illustrative implementation of the SPAD based image pixel 34 of the type shown in FIG. 3. As shown in FIG. 4, image pixel 34 may include a lighting-sensing diode or SPAD 100 having an anode (A) terminal coupled to a voltage line 199 (e.g., a voltage line on which an anode bias voltage Vanode can be provided), quenching circuit 102 coupled to a cathode (C) terminal of SPAD 100, analog counter 106 coupled to the cathode terminal of SPAD 100, comparator 230 having an input coupled to a floating diffusion node FD that is part of the analog counter 106, analog memory circuit 110 coupled to an output of comparator 230, and associated readout circuitry. As an example, Vanode can be different than a ground voltage and/or can be a negative voltage. In response to receiving a single photon 99, SPAD 100 can produce a carrier that results in a detectable change in voltage Vspad at the cathode terminal. Voltage Vspad is sometimes referred to herein as the cathode terminal voltage. In general, an impinging photon may result in a corresponding detectable falling edge or rising edge in the cathode voltage Vspad.

The quenching circuit 102 can include a quenching transistor 204, a cascode transistor 206, and associated quench (ing) logic circuit 208. Quenching transistor 204 may be a p-type transistor such as a p-channel metal-oxide-semiconductor (PMOS) transistor having a source terminal coupled to a first positive power supply line 202-1, a gate terminal coupled to quench logic 208, and a source terminal coupled to the cascode transistor 206. A positive power supply voltage can be provided on power supply line 202-1. The terms "source" and "drain" are sometimes used interchangeably when referring to current-conducting terminals of a metal-oxide-semiconductor transistor. The source and drain terminals are therefore sometimes referred to as "source-drain" terminals. For instance, transistor 204 has at least a first source-drain terminal and a second source-drain terminal.

The term "activate" with respect to a switch (or transistor) may refer to or be defined herein as an action that places the switch in an "on" or low-impedance state such that the two terminals of the switch are electrically connected to conduct current. Activating a switch can sometimes be referred to as turning on or closing a switch. The term "deactivate" with respect to a switch (or transistor) may refer to or be defined herein as an action that places the switch in an "off" or high-impedance state such that the two terminals of the switch/transistor are electrically disconnected with minimal leakage current. Deactivating a switch can sometimes be referred to as turning off or opening a switch.

Cascode transistor 206 may be a p-type (PMOS) transistor having a source terminal coupled to quench transistor 204, a drain terminal coupled to the cathode terminal of SPAD 100, and a gate terminal configured to receive a cascode bias voltage Vbias_cas. Bias voltage Vbias_cas can be generated by an associated bias voltage generation circuit. Cascode transistor 206 is optional and can be omitted from pixel 34. If cascode transistor 206 were to be omitted from pixel 34, the drain terminal of quench transistor 204 would be directly coupled to the cathode terminal of SPAD 100. Quench logic 208 may have inputs configured to receive a count done signal (Count_done) output from analog memory circuit 110 and a clock signal CLK and may output a corresponding voltage for controlling the gate terminal of quench transistor 204. In other words, quench logic 208 can generate a control signal for selectively activating quenching transistor 204 based on signal Count_done and clock signal CLK. Quench logic circuit 208 can include one or more logic gates formed from a plurality of n-type and/or p-type transistors.

Analog counter 106 may include a logic gate such as logic NAND gate 209, a pulse generator such as voltage-controlled pulse generator (VCPG) 210, a charge pumping circuit such as charge pump 212, a clocking logic such as comparator clocking logic circuit 216, a capacitor such as integration capacitor Cint, and a precharge switch such as precharge transistor 214. Logic NAND gate 209 may have a first input coupled to the cathode terminal of SPAD 100, a second input configured to receive the clock signal CLK, and an output on which voltage Vvcpg is produced. Voltage-controlled pulse generator 210 can receive voltage Vvepg from the output of logic gate 209 and a control voltage Vctrl and can output a corresponding pulse signal 211. Pulse signal 211 can have a pulse width PW. A pulse 211 can be generated by voltage-controlled pulse generator 210 in response to analog counter 106 detecting an edge such as falling edge 213 in Vspad. Such falling edge 213 will trigger pulse generator 210 to output a corresponding pulse 211. Comparator clocking logic 216 can receive pulse signal 211 and generate a corresponding comparator clock signal CLK-_comp for controlling comparator 230. Logic circuit 216 can include one or more logic gates formed from a plurality of n-type and/or p-type transistors. Comparator 230 being controlled by comparator clock signal CLK_comp is sometimes referred to as a clocked comparator. Configured in this way, comparator 230 can compare Vint to Vref and output a corresponding comparison result in response to detecting an edge (a rising edge or falling edge) in signal CLK_comp.

Charge pump 212 can receive pulse signal 211 and discharge an integration voltage Vint that is stored on a floating diffusion node FD. Charge pump 212 may have an output that is coupled to node FD. Integration capacitor Cint has a first terminal coupled to node FD and a second terminal coupled to a ground power supply line 200 (e.g., a power supply line on which a ground voltage is provided). Configured in this way, integration voltage Vint is stored across the integration capacitor Cint. The precharge transistor 214 can be a p-type (PMOS) transistor having a drain terminal coupled to floating diffusion node FD, a source terminal coupled to a second positive power supply line 202-2, and a gate terminal configured to receive a precharge control signal PreC. Precharge transistor 214 is sometimes referred to as a reset transistor configured to selectively reset the floating diffusion node (region) FD. A positive power supply voltage can be provided on power supply line 202-2. The power supply voltage on line 202-2 can be the same or can be different from the power supply voltage on line 202-1.

A source follower transistor such as a n-type metal-oxide-semiconductor (NMOS) source follower (SF) transistor 220 can have a drain terminal coupled to a third positive power supply line 202-3, a gate terminal coupled to the floating diffusion node FD, and a source terminal coupled to a row select transistor 222. A positive power supply voltage can be provided on power supply line 202-3. The power supply voltage on line 202-3 can be the same or can be different from the power supply voltages on line 202-1 or 202-2. Row select transistor 222 can have a drain terminal coupled to the source follower transistor 220, a gate terminal configured to receive a row select control signal RS, and a source terminal coupled to a pixel output column line 224. Control signal RS can be selectively asserted by row control circuitry 40 (FIG. 2) for reading out a pixel output voltage Pixout based the current voltage level of floating diffusion node FD. Pixel output column line 224 may be coupled to other pixels 34 arranged along the same column in the image pixel array. Source follower transistor 220 and row select transistor 222 may be considered part of readout circuitry 104 in FIG. 3.

Comparator 230, sometimes referred to as a voltage comparator, may have a first input coupled to floating diffusion node FD, a second input configured to receive a reference voltage Vref, a clock input configured to receive clock signal CLK_comp output from comparator clocking logic 216 of analog counter 106, and an output coupled to analog memory circuit 110. Arranged in this way, comparator 230 can be considered to be coupled or interposed between analog counter 106 and analog memory circuit 110. This example in which comparator 230 is a clocked comparator is illustrative. In other embodiments, comparator 230 can be a non-clocked comparator (e.g., a comparator without a clock input).

Analog memory circuit 110 can have a read enable transistor 240, multiple analog memory capacitors such as Cmem1, Cmem2, and Cmem3, multiple associated capacitor switches, and a logic gate such as logic NOR gate 244. The read enable transistor 240 (or switch) can be an n-type (NMOS) transistor having a first source-drain terminal coupled to the output of comparator 230, a second source-drain terminal coupled to an analog storage node 248, and a gate terminal configured to receive an inverted read enable control signal Read_enb. A first analog memory capacitor Cmem1 may be coupled in series with a first capacitor switch controlled by signal T1 between storage node 248 and voltage line 201 (e.g., a voltage line on which a memory bias voltage Vmem can be provided). A second analog memory capacitor Cmem2 may be coupled in series with a second capacitor switch controlled by signal T2 between storage node 248 and voltage line 201. A third analog memory capacitor Cmem3 may be coupled in series with a third capacitor switch controlled by signal T3 between storage node 248 and voltage line 201. Logic NOR gate 244 may have a first input coupled to a node disposed between Cmem1 and the first capacitor switch, a second input coupled to a node disposed between Cmem2 and the second capacitor switch, a third input coupled to a node disposed between Cmem3 and the third capacitor switch, and an output on which the count done signal Count_done is produced. This signal Count_done can be conveyed to an input of quench logic 208 via path 246.

The example of FIG. 4 in which analog memory 110 includes three capacitors Cmem is illustrative. In general, analog memory 110 can include one or more capacitors Cmem and associated switches, four or more capacitors Cmem and associated switches, four to eight capacitors Cmem and associated switches, 8-16 capacitors Cmem and associated switches, or more than 16 capacitors Cmem and associated switches. The memory capacitors Cmem may be significantly smaller than the integration capacitor Cint. For example, integration capacitor Cint may be at least five times larger than one or more of Cmem, at least 10 times larger than one or more of Cmem, 10-50 times larger than one or more of Cmem, 50-100 times larger than one or more of Cmem, 100-1000 times larger than one or more of Cmem, or more than 1000 times larger than one or more of Cmem. The various analog memory capacitors Cmem1, Cmem2, and Cmem3 can have the same size or can have different sizes. Configured in this way, any signal read out from the larger integration capacitor Cint can generally represent one or more least significant bits (LSBs) of the final readout signal, whereas any signal read out from the smaller analog memory capacitors can generally represent one or more most significant bits (MSBs) of the final readout signal.

An additional source follower transistor such as a n-type metal-oxide-semiconductor (NMOS) source follower (SF) transistor 250 can have a drain terminal coupled to a fourth positive power supply line 202-4, a gate terminal coupled to storage node 248, and a source terminal coupled to an additional row select transistor 252. A positive power supply voltage can be provided on power supply line 202-4. The power supply voltage on line 202-4 can be the same or can be different from the power supply voltages on line 202-1, 202-2, or 202-3. Row select transistor 252 can have a drain terminal coupled to the source follower transistor 250, a gate terminal configured to receive an additional row select control signal RS', and a source terminal coupled to a memory readout line 254. Control signal RS' can be selectively asserted by row control circuitry 40 (FIG. 2) for reading out a memory output voltage Memout based the current voltage level at storage node 248. Source follower transistor 250 and row select transistor 252 may also be considered part of readout circuitry 104 in FIG. 3.

Figure 5:
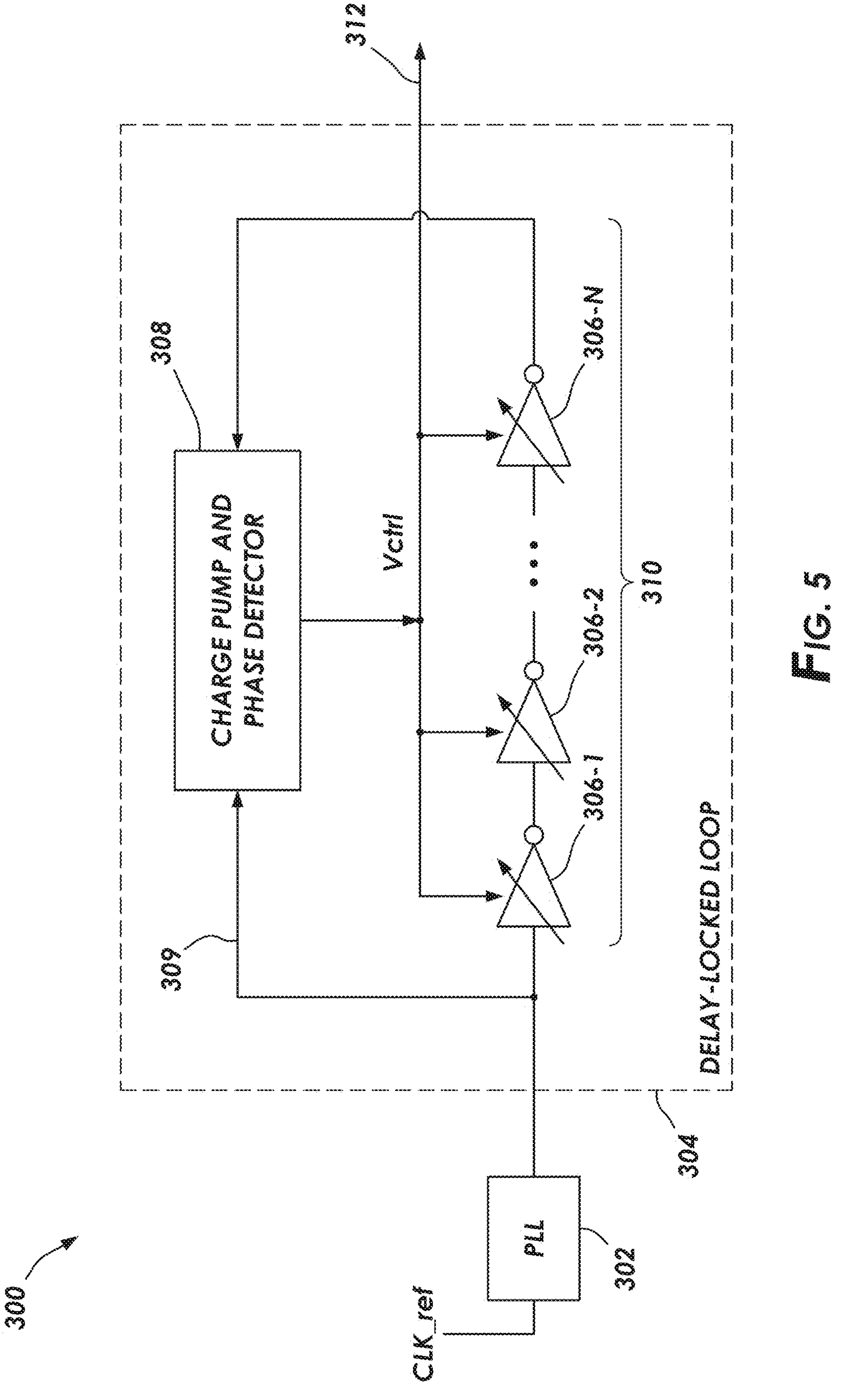
FIG. 5 is a circuit diagram of an illustrative delay-locked loop (DLL) circuit configured to generate a control voltage signal in accordance with some embodiments.

The control voltage Vctrl for tuning voltage-controlled pulse generator 210 may be produced by a control voltage generator such as control voltage generator 300 shown in FIG. 5. As shown in FIG. 5, control voltage generator 300 can include a phase-locked loop (PLL) 302 coupled to a delay-locked loop (DLL) 304. The PLL 302 can have an input configured to receive a reference clock signal CLK_ref and an output coupled to DLL 304. Delay-locked loop 304 may include a series of N inverting circuits such as inverters 306-1, 306-2, . . . , and 306-N, sometimes referred to as a chain of inverters. In general, N can represent an integer that is greater than five, greater than ten, 10-20, 20-50, 50-100, or more than 100.

The output of the last inverter 306-N may be coupled to an input of charge pump and phase detector circuit 308. The charge pump and phase detector circuit 308 can have another input that is coupled to an input of the first inverter 306-1 via path 309. Charge pump and phase detector 308 can output control voltage Vctrl for tuning the delay of the N series-connected inverters. The N series-connected inverters configured in this way is sometimes referred to as a voltage-controlled delay line 310. Each inverter 306 having a drive strength that is modulated by Vctrl is sometimes referred to as a current-starved inverter. Control voltage generator 300 can be disposed along a peripheral edge of the image pixel array, where control voltage Vctrl is conveyed to each SPAD based pixel 34 via control line 312.

Figure 6:
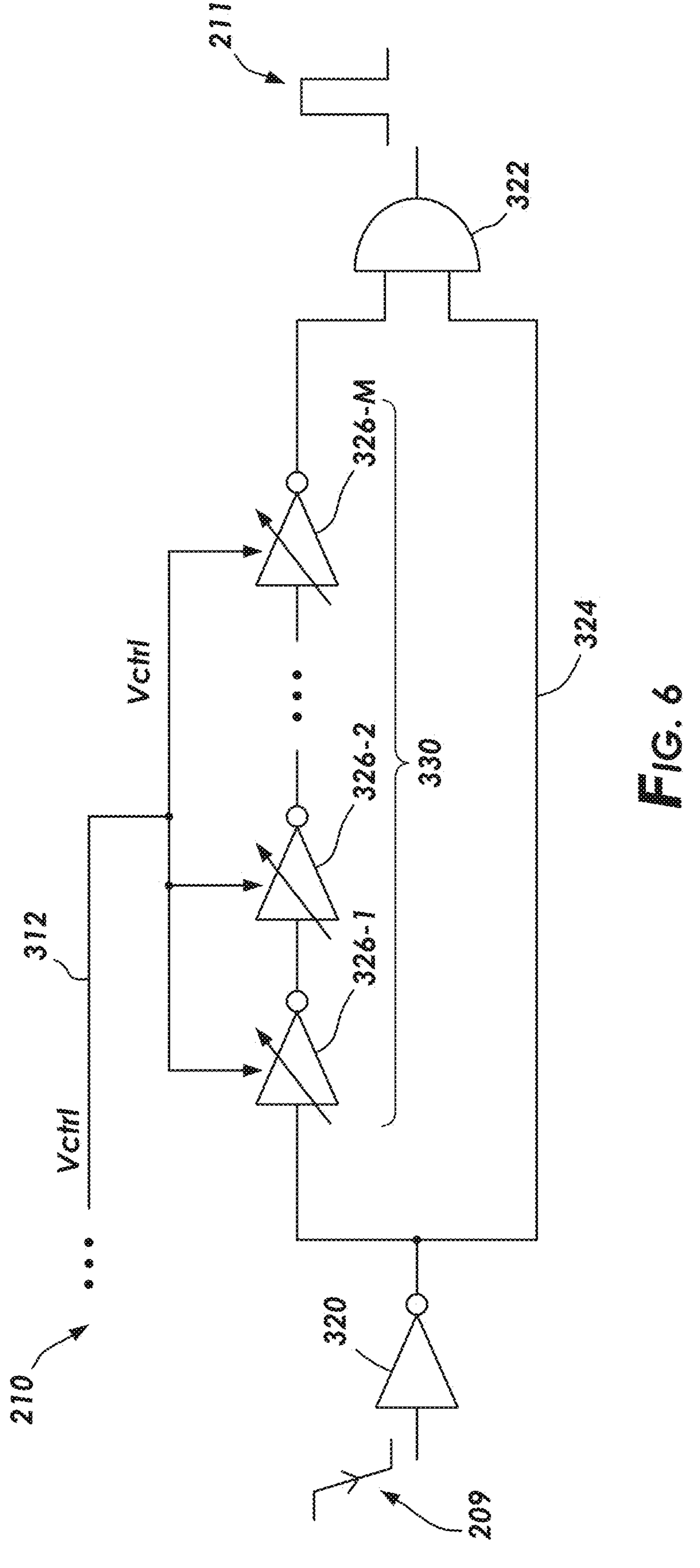
FIG. 6 is a circuit diagram of an illustrative voltage-controlled pulse generator that can be controlled by the control voltage signal generated by the DLL circuit of FIG. 5 in accordance with some embodiments.

FIG. 6 is a circuit diagram of an illustrative voltage-controlled pulse generator 210 disposed within each SPAD based image pixel 34. As shown in FIG. 6, voltage-controlled pulse generator 210 may include an input inverter 320 and a series of M inverting circuits such as inverters 326-1, 326-2, . . . , and 326-M, sometimes referred to as a chain of starved inverters. Inverter 320 has an output that is coupled to an input of the first inverter 326-1. In general, M can represent an odd integer that is less than N, less than ten, less than 20, less than five, three, or other suitable odd integer value. The M series-connected inverters configured in this way is sometimes referred to as a voltage-controlled delay line 330.

Each inverter 326 in delay line 330 may be a copy or replica of the inverters 306 in delay line 310. In other words, inverters 306 and 326 can exhibit the same drive strength and transistor sizing. If desired, delay line 310 and/or delay line 330 can optionally include always-active logic AND gates coupled in series with the inverters for improved matching. Each inverter 326 can have a drive strength that is modulated by Vctrl provided over signal line 312. Voltage-controlled pulse generator 210 may further include a logic gate such as logic AND gate 322 having a first input coupled to an output of the last inverter 326-M, a second input coupled to an input of the first inverter 326-1 in delay line 330 via connection 324, and an output on which pulse signal 211 can be generated (see also FIG. 4). Configured in this way, pulse signal 211 can exhibit a pulse width that is locked with minimal sensitivity to process, voltage, and temperature (PVT) variations.

Figure 7:
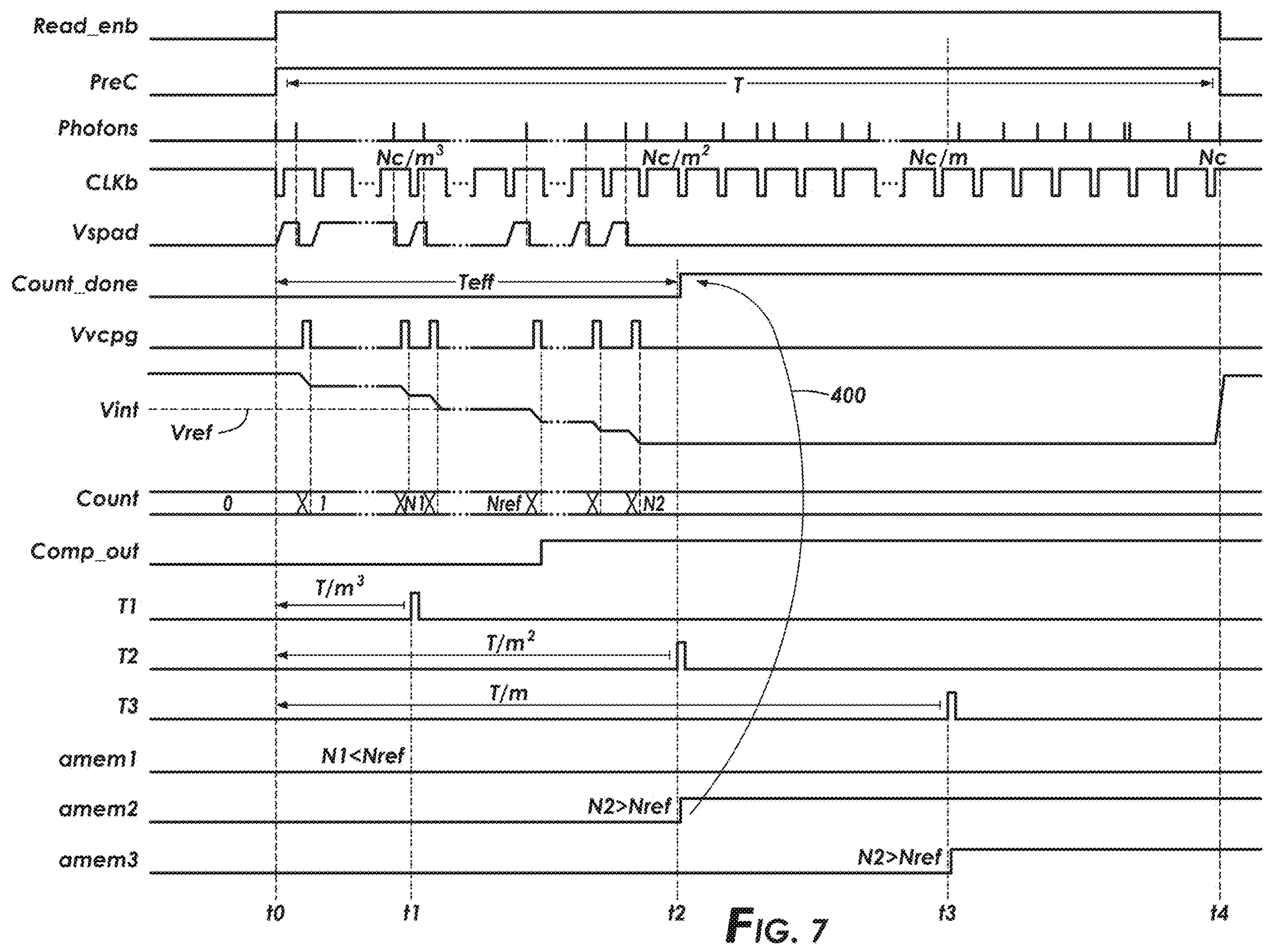
FIG. 7 is a timing diagram illustrating the behavior of relevant signals for operating a SPAD based image pixel of the type shown in connection with FIGS. 3-6 in accordance with some embodiments.

The operation of the SPAD based image pixel 34 of the type described in connection with FIGS. 1-6 is best understood in conjunction with the timing diagram of FIG. 7. FIG. 7 illustrates the behavior of the relevant signals within image pixel 34 during an integration time from time t0 to time t4. The duration of the integration time is indicated by time period T. Prior to time t0, voltage Vspad may be low, signal Read_enb may be low, and signal PreC is low, which activates transistor 214 and drives voltage Vint at the floating diffusion node up to a high voltage level. Pixel 34 may have an initial photon count of "0." The output of comparator 230 (Comp_out) can also have an initial low value.

At the beginning of the integration time at t0, signal Read_enb and the precharge signal PreC can be driven high. Driving signal PreC high turns off transistor 214, which allows voltage Vint to change. Driving signal Read_enb high activates transistor 240 so that the output of comparator 230 is coupled to analog memory circuit 110. After this point, the clock signal controlling the analog counter 106 and the quench logic 208 may begin to toggle. FIG. 7 illustrates an inverted version of the clock signal CLKb. This clock signal may be configured to pulse Nc times during the integration period. Nc may be an integer that represents the full counter capacity of pixel 34.

During the integration time period, a number of photons may strike SPAD 100. Each time a photon strikes SPAD 100 can cause a corresponding falling edge in voltage Vspad. This can be detected by analog counter 106 by generating a corresponding pulse in voltage Vvcpg at the input of voltage-controlled pulse generator 210. This will cause pulse generator 210 to output a pulse signal that causes charge pump 212 to pull down voltage Vint by a deterministic voltage step. Every time Vint is reduced by a voltage step, the effective photon count of pixel 34 increments by one.

In accordance with an embodiment, pixel 34 is configured to capture the status of comparator 230 at multiple different timestamps. As shown in the example of FIG. 7, pixel 34 may be configured to capture the status of comparator 230 at time t1, at time t2, and at time t3. Time t1 occurs T/m^3 after time t0. Time t2 occurs T/m^2 after time t0. Time t3 occurs T/m after time t0. Integer m can refer to and be defined herein as a counter division ratio. The counter division ratio m can be equal to 2, 3, 4, 5, 6, 7, 8, 9, 10, or other integer value. In an example where m is equal to 2, times t1, t2, and t3 can occur at T/8, T/4, and T/2, respectively. In another example where m is equal to 8, times t1, t2, and t3 can occur at T/512, T/64, and T/8, respectively. Operated in this way, the comparator sampling times at t1, t2, and t3 are unevenly spaced out during the integration period. For instance, the time period from t0 to t1 may have a first value, the time period from t1 to t2 may have a second value equal to or greater than the first value, and the time period from t2 to t3 may have a third value that is greater than the second value. Arranged in this way, signal CLKb may pulse Nc/m^3 times from time t0 to t1, may pulse Nc/m^2 times from time t0 to t2, and may pulse Nc/m times from time t0 to t3.

At time t1, signal T1 is pulsed high to temporarily activate the first capacitor switch coupled in series with capacitor Cmem1. At this point, comparator 230 can compare the current Vint value to Vref. The reference voltage Vref may have a voltage level that is set equal to a desired voltage level lower than the saturation level (e.g., to the voltage step per count described in connection with Vint multiplied by Nsat and divided by counter division ratio m). Nsat may be an integer that represents the analog counter full range or depth. In some embodiments, Nsat can be set equal to any value lower than Nc. In terms of the counter value, pixel 34 can determine at time t1 whether the current count N1 at time t1 is greater than Nref, where Nref represents the effective analog count when Vint is equal to Vref. In the example of FIG. 7, the current analog counter value N1 is still less than Nref, so comparator 230 will output a low voltage that can then be stored onto Cmem1, as indicated by a low amem1 value at time t1.

At time t2, signal T2 is pulsed high to temporarily activate the second capacitor switch coupled in series with capacitor Cmem2. At this point, comparator 230 can compare the current Vint value to Vref. In the example of FIG. 7, the effective analog count did reach and exceed Nref sometime between t1 and t2. At that point, the comparator output Comp_out can be driven high. Here, pixel 34 can then determine at time t2 whether the current count N2 at time t2 is greater than Nref. In the example of FIG. 7, the current analog counter value N2 is greater than Nref, so comparator 230 will now output a high voltage that can then be stored onto Cmem2, as indicated by a high amem2 value at time t2. At this point, the logic NOR gate 244 will assert or drive signal Count_done high, as indicated by arrow 400. The time period from time t0 until Count_done is driven high can be referred to as the effective integration time Teff. After signal Count_done is driven high, the count value of analog counter 106 will remain fixed at N2 while Vint stays fixed at its current voltage level.

At time t3, signal T3 is pulsed high to temporarily activate the third capacitor switch coupled in series with capacitor Cmem3. At this point, comparator 230 can compare the current Vint value to Vref. As described above, the current analog counter value is fixed at N2, which is greater than Nref, so comparator 230 outputs a high voltage that can then be stored onto Cmem3, as indicated by a high amem3 value at time t3. The logic NOR gate 244 will maintain its assertion of signal Count_done. At time t4, signals Read_enb and PreC can be driven low. Driving signal Read_enb low will decouple analog memory circuit 110 from the output of comparator 230. Driving signal PreC low will precharge Vint up to a high voltage.

The example of FIG. 7 in which the status of comparator 230 is checked or sampled at three varying points in time during the integration period is illustrative. As another example, the status of comparator 230 can be checked only two times (e.g., at points in time that are 1/m^2 and 1/m of the integration period T) and the corresponding sampled results can be stored on two respective analog memory capacitors. As another example, the status of comparator 230 can be checked four times (e.g., at various points in time that are 1/m^4, 1/m^3, 1/m^2 and 1/m through the integration period T) and the corresponding results can be stored on four respective analog memory capacitors. In general, the status of comparator 230 can be checked two or more times and the corresponding results can be stored on two or more analog memory capacitors. Operating a SPAD based image pixel in this way can be technically advantageous and beneficial to provide high precision photon counting capabilities with excellent low light sensitivity and high dynamic range that may be suitable for night vision imaging and a wide variety of imaging applications.

The timing of FIG. 7 is illustrative. In some embodiments, one or more of the described operations may be modified, replaced, or omitted. In some embodiments, one or more of the described operations may be performed in parallel. In some embodiments, additional processes may be added or inserted between the described operations. If desired, the order of certain operations may be reversed or altered and/or the timing of the described operations may be adjusted so that they occur at slightly different times. In some embodiments, the described operations may be distributed in a larger system.

The foregoing is merely illustrative and various modifications can be made to the described embodiments. The foregoing embodiments may be implemented individually or in any combination.

What is claimed is:

1. An image sensor pixel comprising:

a single-photon avalanche diode (SPAD);

an analog counter coupled to a cathode terminal of the SPAD; and a comparator having a first input coupled to a floating diffusion node in the analog counter, a second input configured to receive a reference voltage, and a clock input configured to receive a comparator clock signal from the analog counter.

2. The image sensor pixel of claim 1, further comprising:

an analog memory circuit selectively coupled to an output of the comparator.

3. The image sensor pixel of claim 2, wherein the analog memory circuit comprises:

a read enable switch coupled between the output of the comparator and a storage node; and a plurality of capacitors coupled to the storage node via respective switches.

4. The image sensor pixel of claim 3, further comprising:

a quench transistor coupled to the cathode terminal of the SPAD; and a quench logic circuit configured to output a voltage to a gate terminal of the quench transistor, wherein the analog memory circuit further comprises a logic gate having inputs coupled to the plurality of capacitors and having an output coupled to the quench logic circuit.

5. The image sensor pixel of claim 4, wherein the logic gate comprises a logic NOR gate.

6. The image sensor pixel of claim 1, wherein the analog counter comprises:

a voltage-controlled pulse generator having an input coupled to the cathode terminal of the SPAD;

a charge pump having an input coupled to the voltage-controlled pulse generator and having an output coupled to the floating diffusion node; and an integration capacitor coupled between the floating diffusion node and a power supply line.

7. The image sensor pixel of claim 6, wherein the analog counter further comprises:

a logic gate having a first input coupled to the cathode terminal of the SPAD, a second input configured to receive a clock signal, and an output coupled to the input of the voltage-controlled pulse generator; and a clocking logic circuit having an input coupled to the input of the charge pump and configured to generate the comparator clock signal.

8. The image sensor pixel of claim 6, wherein:

the voltage-controlled pulse generator is configured to receive a control voltage produced from a delay-locked loop (DLL) circuit;

the DLL circuit comprises a first number of inverting circuits; and the voltage-controlled pulse generator comprises a second number, less than the first number, of inverting circuits that are replicas of the inverting circuits of the DLL circuit.

9. The image sensor pixel of claim 6, wherein the analog counter further comprises:

a precharge transistor having a first source-drain terminal coupled to the floating diffusion node, a second source-drain terminal coupled to an additional power supply line different than the power supply line, and a gate terminal configured to receive a precharge control signal.

10. The image sensor pixel of claim 1, further comprising:

an analog memory circuit selectively coupled to an output of the comparator;

a first source follower transistor having a gate terminal coupled to the floating diffusion node;

a first row select transistor coupled between the first source follower transistor and a pixel output line;

a second source follower transistor having a gate terminal coupled to a storage node in the analog memory circuit; and a second row select transistor coupled between the second source follower transistor and a memory output line.

11. A method of operating an image sensor pixel, comprising:

with a single-photon avalanche diode (SPAD), detecting a photon;

with an analog counter, adjusting an integration voltage at an integration capacitor by a step size and pulsing a comparator clock signal in response to detecting the photon; and with a comparator, receiving the comparator clock signal from the analog counter and comparing the integration voltage with a reference voltage in response to detecting an edge in the comparator clock signal.

12. The method of claim 11, further comprising:

with an analog memory circuit having a plurality of memory capacitors, selectively sampling a comparison result output from the comparator.

13. The method of claim 12, wherein the integration capacitor is at least five times larger than each memory capacitor in the plurality of memory capacitors.

14. The method of claim 12, further comprising:

with a read enable transistor in the analog memory circuit, passing the comparison result output from the comparator to a storage node in the analog memory circuit during an integration period with a duration T;

selectively activating a first switch coupled between the storage node and a first memory capacitor in the plurality of memory capacitors; and selectively activating a second switch coupled between the storage node and a second memory capacitor in the plurality of memory capacitors.

15. The method of claim 14, further comprising:

selectively activating a third switch coupled between the storage node and a third memory capacitor in the plurality of memory capacitors.

16. The method of claim 14, wherein:

selectively activating the first switch occurs after T/m ^2 from a start of the integration period, wherein m is an integer greater than or equal to two; and selectively activating the second switch occurs after T/m from the start of the integration period.

17. An image sensor pixel comprising:

a light-sensing diode;

an analog counter coupled to a cathode terminal of the light-sensing diode and having an integration capacitor, wherein the analog counter comprises:

a voltage-controlled pulse generator;

a logic gate coupled between the cathode terminal of the light-sensing diode and an input of the voltage-controlled pulse generator;

a charge pump coupled between an output of the voltage-controlled pulse generator and the integration capacitor; and a precharge transistor configured to precharge the integration capacitor;

a comparator having an input coupled to the analog counter; and an analog memory circuit coupled to an output of the comparator and having a plurality of memory capacitors smaller than the integration capacitor.

18. The image sensor pixel of claim 17, wherein the light-sensing diode comprises a single-photon avalanche diode (SPAD).

19. The image sensor pixel of claim 17, wherein the analog memory circuit further comprises:

a read enable switch coupled between the output of the comparator and a storage node of the analog memory circuit;

a first switch coupled between the storage node and a first memory capacitor in the plurality of memory capacitors;

a second switch coupled between the storage node and a second memory capacitor in the plurality of memory capacitors;

a third switch coupled between the storage node and a third memory capacitor in the plurality of memory capacitors; and a logic gate having a first input coupled to a first node disposed between the first switch and the first memory capacitor, a second input coupled to a second node disposed between the second switch and the second memory capacitor, a third input coupled to a third node disposed between the third switch and the third memory capacitor, and an output coupled to a quench transistor coupled to the cathode terminal of the light-sensing diode.

* * * * *